Aug. 19, 1958  J. VAN DYCK FEAR  2,848,384
REFINING LUBRICATING OILS
Filed June 20, 1955
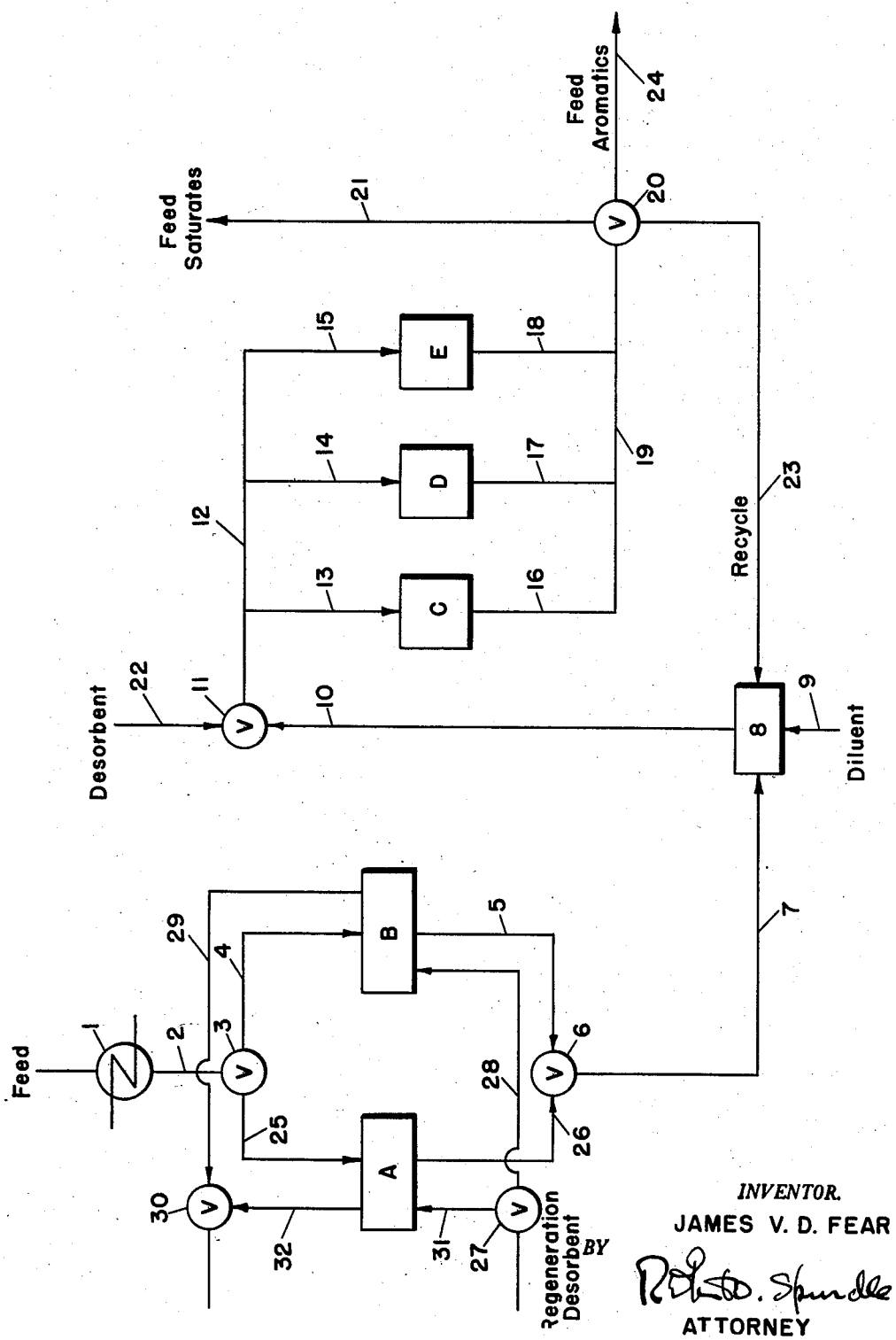
INVENTOR.
JAMES V. D. FEAR
BY
Robt D. Spindle
ATTORNEY

United States Patent Office 2,848,384
Patented Aug. 19, 1958

2,848,384

REFINING LUBRICATING OILS

James Van Dyck Fear, Media, Pa., assignor to Sun Oil Company, Philadelphia, Pa., a corporation of New Jersey Application June 20, 1955, Serial No. 516,424

2 Claims. (Cl. 196—147)

This invention relates to the separation of aromatics and other low viscosity index materials from mineral oils of lubricating oil viscosity by preferential adsorption on a solid adsorbent, and more particularly to a method for preventing loss of adsorbent capacity due to the presence of strongly adsorbed materials in the feed.

Cyclic adsorption processes for the fractionation of complex mixtures of hydrocarbons into an adsorbate and a percolate of different chemical characters are well known. In such processes a liquid feed is contacted with an adsorbent such as silica gel, activated carbon, or activated alumina or other adsorbent materials in order to preferentially adsorb the more readily adsorbable components of the feed and to produce a percolate richer in less strongly adsorbable material. After the capacity of the adsorbent to adsorb the more easily adsorbable components of the feed has been substantially exhausted, flow of the feed is shut off, and a desorbent of a boiling point substantially different from the feed is passed through the adsorbent to remove adsorbed materials and to recondition the adsorbent for use in treating an additional portion of feed in a succeeding cycle.

Feeds to such a process ordinarily contain minor amounts of very strongly adsorbed compounds, such as nonhydrocarbon compounds of nitrogen, sulfur, or oxygen or certain polynuclear hydrocarbons. Such compounds, which are generally referred to as gel poisons, are much more readily adsorbed than the other components of the feed or of the desorbent, and cannot be removed from the adsorbent during the desorption step of the process by desorbents suitable for use in a cyclic adsorption-desorption process. Consequently, even though the feed may contain only trace amounts of such gel poisons, they tend to build up on the adsorbent and reduce its capacity to take up feed components to a point at which the economics of the process are adversely affected. For example, in processing a feed containing approximately 0.2% gel poisons, after only 100 adsorption-desorption cycles the capacity of the adsorbent to take up feed aromatics may be reduced to approximately 70% of the original capacity. In plant practice, when the capacity of the adsorbent has been reduced to about 80% of its original value and is continuing to drop, it is necessary to take the unit off stream and regenerate the adsorbent by removing the very strongly adsorbed compounds. These compounds, due to their high boiling ranges, cannot be driven off by heat alone, since the temperatures required would destroy the adsorptive powers of the gel, and it is necessary to displace them by passing a low-boiling highly polar compound, such as methanol or acetone, through the adsorbent until the objectionable compounds are removed, and then boiling off the methanol or acetone with a less strongly adsorbed compound, such as hot benzene.

When processing lower boiling hydrocarbons, such as catalytically reformed naphthas, in order to recover benzene, toluene and xylenes, proposals have heretofore been made to incorporate one or more guard cases in the system in order to remove the gel poisons from the feed, and prevent them from coming into contact with the main adsorbent masses in which separation of aromatics is accomplished. The guard case is filled with adsorbent material, which may or may not be the same material as that contained in the main adsorbent cases, and feed is passed continuously through it until the capacity of the adsorbent material to extract poisons from the feed has been largely exhausted, after which the feed is switched to a second guard case while regeneration of the adsorbent in the first guard case is carried out. By this means it is possible to continuously supply a purified feed to the cases in which the adsorption-desorption cycle is taking place, and allow the operation to continue almost indefinitely without regeneration of the main adsorbent mass. Such a process has been described in U. S. Patent 2,628,933 to Eagle.

While such guard cases have been successfully used when treating hydrocarbons of the type of naphthas and kerosenes, I have found that when processing petroleum stocks of lubricating oil viscosities, they are ineffective to remove gel poisons, substantially completely, when operated at the same temperature as the main adsorbent cases, and that the capacity of the main adsorbent for aromatics and other low V. I. constituents of the feed falls off rapidly, due to the preferential adsorption therein of gel poisons passing through the guard case into the main body of adsorbent. Consequently it is impossible to operate the plant at full theoretical capacity during such time as the process is on stream, and it is necessary either to shut down the plant periodically for regeneration of the adsorbent, or to provide substantially duplicate facilities in order to maintain the plant on stream. For example, in U. S. Patent 2,441,572 to Hirschler et al., it has been proposed to pass the feed in series through a number of adsorption cases, in which the adsorbent is progressively less contaminated by gel poisons, and to take each case off stream for regeneration as its capacity for aromatics diminishes to an uneconomical point. In such a process it is necessary to provide six cases, of which only three are on stream at any given time, and of the three only the last is operating at full theoretical capacity. For this reason processing of lubricating oils by adsorption has not heretofore been commercially practiced.

The reason why the guard case is ineffective when dealing with lubricating fractions is unknown, but I believe that the probable cause for its failure is that, at the temperatures at which the adsorption process is most efficiently operated, the aromatics in these oils are so viscous that they will plug the pores of the adsorbent to such an extent that the gel poisons find great difficulty in entering the pores to desorb aromatics and be themselves adsorbed and removed from the feed. For example, an unrefined lubricating fraction having a S. U. S. viscosity of 160 at 100° F. may contain as much as 25% aromatics having a viscosity up to 1000 or more, and the viscosity of the aromatic components of higher viscosity stocks is of course much greater. Dilution of the feed with a light solvent, such as pentane, in order to reduce the overall viscosity does not effectively reduce the viscosity of the aromatics once they have entered the pores of the adsorbent, since the aromatics are concentrated therein to such an extent that their viscosity approaches that of an undiluted aromatic fraction. Consequently, the gel poisons can find but little free surface on which to be adsorbed, and the capacity of the guard case for eliminating such poisons is greatly reduced.

I have now found that if the feed to the guard case is heated to moderately elevated temperatures, somewhat above the optimum temperature at which the feed is passed to the main adsorbent case, that the viscosity of the exceedingly low V. I. aromatics may easily be reduced to a point at which they will no longer plug the pores of the adsorbent, allowing free entrance into, and adsorption therein, of the gel poisons. By so operating, the full capacity of the guard case for removal of gel poisons can be taken advantage of, the adsorbent in the main adsorbent cases may be maintained essentially free from gel poisons, and operation may be maintained over an indefinite period of time at full operating efficiency. The temperature to which the feed stock should be heated will, of course, vary to some extent depending upon the viscosity of the feed and the nature of the crude from which it was prepared, but generally speaking the feed should be heated to at least 150° F. and preferably above 175° F. in the case of light lubricating fractions, and as high as 250° F. or over in the case of heavier fractions. Higher temperatures may, of course, be used but, since adsorbents lose capacity at elevated temperatures, it is preferred to operate at as low a temperature possible consistent with good results in order not to lower needlessly the capacity of the guard case adsorbent for gel poisons, and to avoid cracking the oil.

In order that those skilled in the art may more fully appreciate the nature of my invention, and the manner of carrying it out, it will be further described in connection with the accompanying drawing, which is a diagrammatic flow sheet of a typical adsorbent process for the treatment of a lubricating stock to improve V. I. and other lubricating qualities.

As illustrated in the drawing, a feed stock comprising a hydrocarbon fraction of lubricating viscosity, which may or may not be diluted with a light solvent, such as pentane, is passed through a heater 1, in which it is heated to the desired temperature, say 250° F., and then through line 2, valve 3 and line 4 to guard case B, which is packed with a suitable adsorbent, such as silica gel. The feed contacts the gel in guard case B in passing therethrough, and the gel poisons are adsorbed by the gel and retained in guard case B. The feed, now free of gel poisons, is taken through line 5, valve 6 and line 7 to storage 8, in which it is cooled to room temperature or such other temperature at which it is desired to operate the main adsorbent process. In the event that the feed to the guard case was not diluted, or in case that it is desired to add more diluent at this point, diluent may be introduced into storage 8 through line 9, in order to reduce the viscosity of the feed to the main adsorbent case to the desired degree. The feed is then taken through line 10, valve 11, manifold 12, and lines 13, 14, and 15 to adsorbent cases C, D, and E.

In passing through adsorbent cases C, D, and E, which are packed with silica gel or other suitable adsorbent, the greater part of the aromatics will be removed from the feed, and a percolate of high viscosity index mixed with desorbent from a previous cycle and with diluent will be recovered through lines 16, 17, and 18 and taken off through manifold 19 and valve 20 and line 21 to processing for the recovery of desorbent, diluent and a high V. I. lubricating oil. Feed will be continued to be passed to adsorbent case C, D, and E until the capacity of the adsorbent to extract aromatics from the feed is reduced to a point at which it is desired to discontinue the feed. This point will vary within wide limits, depending on the degree of refinement which it is desired to give to the finished oil. For example, if a highly refined oil is desired, flow of feed may be discontinued when the gel still has a substantial capacity to adsorb aromatics, while if a moderately refined oil is desired, flow of feed through the gel may be continued until the effluent contains a substantial amount of aromatics. At this time valve 11 will be switched to shut off the flow of feed, and to allow desorbent, which may be a mixture of lower boiling paraffins and aromatics, such as pentane and benzene or toluene to pass through line 22, valve 11, manifold 12 and lines 13, 14, and 15 to adsorbent cases C, D, and E. Flow of the desorbent into the adsorbent cases will push out the adsorbed feed components, the next fraction issuing therefrom comprising a mixture of feed aromatics and feed saturates, which mixture may be conveniently taken off through valve 20 and line 23 back to storage 8 for recycle to the process in the event that a highly refined lubricating oil is desired. If only a moderately refined oil is required, this fraction, or a portion thereof, may be mixed with the high V. I. fraction previously recovered, and passed to further processing through line 21, or all or a part thereof may be mixed with the aromatic rich fraction next to issue from the gel case. The next fraction issuing from the adsorber case will comprise desorbent, diluent and feed aromatics together with a minor amount of feed saturates which are taken off through valve 20 and line 24 for recovery of diluent and desorbent to end the cycle.

Flow of desorbent to adsorbent cases C, D, and E is shut off when the adsorbent in the upper part of the case is substantially free of feed components, at which time valve 11 is manipulated to pass feed from storage 8 to the absorber cases C, D, and E, to start a new cycle.

This operation is continued until the capacity of the adsorbent in guard case B for gel poisons is substantially exhausted, at which time valve 3 will be manipulated to cut off flow of feed to guard case B and to divert it through line 25 to guard case A, which is packed with regenerated adsorbent. Feed free of gel poisons will flow through line 26, valve 6 and line 7 to storage 8, and thence to the main adsorption cases. Valve 27 is then opened to pass regeneration desorbent, such as methanol or acetone, through line 28 to guard case B and thence off through line 29 and valve 30 to processing for the recovery of regeneration desorbent. When substantially all of the gel poisons have been desorbed from the adsorbent in guard case B flow of methanol or acetone is cut off, and a hot less strongly adsorbed material, such as benzene at 300° F., is passed through line 28, guard case B, line 29 and valve 30 until all of the methanol or acetone has been boiled off the adsorbent in guard case B. At this time valve 3 will be switched to again send feed to guard case B as in the system of operation described above. The adsorbent in guard case A, which is now contaminated with gel poisons, is regenerated by passing desorbent through valve 27, line 31, guard case A, line 32 and valve 30 in the same manner as has been described for the regeneration of the adsorbent in guard case B.

As may be seen from the foregoing, I have provided a highly efficient method for the adsorbent refining of lubricating oils, which allows the main adsorbent cases to operate indefinitely at full capacity. The heating of the feed stock prior to passage thereof to the guard case is of the essence of the invention, since without such heating the gel poisons will not be adsorbed in the guard cases and will pass through them to contaminate the adsorbent in the main adsorption cases, to reduce their efficiency. The guard case need not be very large in capacity as compared to the main adsorption case, and it is possible, although but three main adsorption cases are shown, to incorporate many more in the system without exhausting the capacity of the guard cases, in their alternate adsorption-desorption cycles, to purify the feed to the main adsorption cases.

It will further be appreciated that while in the process as described all of the main adsorbent cases are simultaneously receiving either feed or desorbent, the process may also be operated in a manner such that one or more of the cases may be receiving feed, while the others are receiving desorbent, in order to provide a more continuous flow of feed saturates and feed aromatics to further processing. Illustration of such operation would, however, unduly complicate the drawing, and is believed to be unnecessary, since my invention relates solely to the removal of gel poisons from the feed prior to passage thereof to the main adsorbent cases.

I claim:

1. In an adsorption process for the removal of low V. I. aromatic constituents from mineral oils of lubricating viscosity containing a minor proportion of very strongly adsorbable compounds, the improvement which comprises contacting a first adsorbent mass with a mineral oil feed stock of lubricating viscosity comprising an aromatic fraction of high viscosity at room temperature, a saturate fraction of lower viscosity at room temperature and a minor proportion of gel poisons, which has been heated to a temperature of between about 150° F. to about 250° F., and sufficient to reduce the viscosity of the aromatic fraction to a point such that it presents no substantial resistance to the entry of the gel poisons into the pores of the adsorbent, withdrawing a mineral oil substantially free of gel poisons, passing said mineral oil, at a lower temperature not in excess of about 200° F., through a second adsorbent mass, and withdrawing a percolate poorer in aromatics than the feed.

2. The process according to claim 1 in which the adsorbent is silica gel.

References Cited in the file of this patent

UNITED STATES PATENTS

| | | |
|---|---|---|
| 2,390,917 | Breth et al. | Dec. 11, 1945 |
| 2,566,353 | Mills | Sept. 4, 1951 |
| 2,571,380 | Penick | Oct. 16, 1951 |
| 2,628,933 | Eagle et al. | Feb. 17, 1953 |